(12) United States Patent
Li (10) Patent No.: US 11,074,444 B2
(45) Date of Patent: Jul. 27, 2021

(54) METHOD AND APPARATUS FOR USE IN PREVIEWING DURING IRIS RECOGNITION PROCESS

(71) Applicant: ADVANCED NEW TECHNOLOGIES CO., LTD., Grand Cayman (KY)

(72) Inventor: Xiaofeng Li, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 49 days.

(21) Appl. No.: 16/579,331

(22) Filed: Sep. 23, 2019

(65) Prior Publication Data

US 2020/0019774 A1   Jan. 16, 2020

Related U.S. Application Data

(63) Continuation of application No. PCT/CN2018/083590, filed on Apr. 18, 2018.

(30) Foreign Application Priority Data

Apr. 21, 2017   (CN) .......................... 201710266805.4

(51) Int. Cl.
*G06K 9/00*   (2006.01)
*G06F 3/14*   (2006.01)

(52) U.S. Cl.
CPC ........... *G06K 9/00604* (2013.01); *G06F 3/14* (2013.01); *G06K 9/0061* (2013.01); *G06K 9/00228* (2013.01); *G06K 9/00617* (2013.01)

(58) Field of Classification Search
CPC ......................................................... G06F 3/14
See application file for complete search history.

(56) References Cited

U.S. PATENT DOCUMENTS

| | | |
|---|---|---|
| 7,865,075 B2 | 1/2011 | Watanabe |
| 8,705,808 B2 | 4/2014 | Determan et al. |
| 8,842,888 B2 | 9/2014 | Pritikin et al. |
| 8,995,785 B2 | 3/2015 | Knight et al. |
| 2003/0093805 A1 | 5/2003 | Gin |
| 2005/0084137 A1 | 4/2005 | Kim et al. |
| 2005/0270386 A1 | 12/2005 | Salton et al. |
| 2005/0286799 A1 | 12/2005 | Huang et al. |

(Continued)

FOREIGN PATENT DOCUMENTS

| | | |
|---|---|---|
| CN | 100438580 C | 11/2008 |
| CN | 105611153 A | 5/2016 |

(Continued)

OTHER PUBLICATIONS

International Preliminary Report on Patentability Chapter I for PCT Application No. PCT/CN2018/083590 dated Oct. 31, 2019.

(Continued)

*Primary Examiner* — Edward Park (57) ABSTRACT

Methods, systems, and apparatuses, including computer programs encoded on computer storage media, for preview in iris recognition are provided. One of the methods includes: obtaining an iris image and a facial image of a user; determining a preview image corresponding to the iris image based on the facial image; and displaying the determined preview image.

18 Claims, 4 Drawing Sheets

(56) References Cited

U.S. PATENT DOCUMENTS

| | | | |
|---|---|---|---|
| 2008/0069411 A1* | 3/2008 | Friedman | G06K 9/00604 382/118 |
| 2008/0292144 A1 | 11/2008 | Kim | |
| 2010/0128937 A1* | 5/2010 | Yoo | G06K 9/00892 382/117 |
| 2013/0089240 A1 | 4/2013 | Northcott et al. | |
| 2015/0362700 A1 | 12/2015 | Prabhakar et al. | |
| 2016/0092720 A1* | 3/2016 | Lee | G06K 9/00604 348/78 |
| 2016/0358318 A1* | 12/2016 | Zhang | G06K 9/00288 |
| 2016/0364561 A1 | 12/2016 | Lee | |
| 2017/0342757 A1 | 11/2017 | Kikuta | |
| 2018/0285544 A1* | 10/2018 | Chang | G06F 21/32 |
| 2020/0019774 A1* | 1/2020 | Li | G06K 9/2054 |

FOREIGN PATENT DOCUMENTS

| | | |
|---|---|---|
| CN | 105956538 A | 9/2016 |
| CN | 107368775 A | 11/2017 |
| JP | 2002-288671 A | 10/2002 |
| JP | 2005-334402 A | 12/2005 |
| JP | 2016-98625 A | 5/2016 |
| JP | 2016527769 A | 9/2016 |
| JP | 2017-208638 A | 11/2017 |
| KR | 20020028406 A | 4/2002 |
| KR | 100729280 B1 | 6/2007 |
| KR | 20160036359 A | 4/2016 |
| WO | 03060814 A1 | 7/2003 |
| WO | 2015137645 A1 | 9/2015 |
| WO | 2018192531 A1 | 10/2018 |

OTHER PUBLICATIONS

Examination Report for European Application No. 18788594.2 dated Jun. 8, 2020.
Written Opinion of the International Searching Authority and International Search Report for PCT Application No. PCT/CN2018/083590 dated Jul. 6, 2018 (13 pages).
Non-final rejection and Search Report for Taiwanese Application No. 107108415 dated Apr. 22, 2019 (11 pages).
Search Report for European Application No. 18788594.2 dated Mar. 9, 2020.
Second Office Action for Chinese Application No. 201710266805.4 dated Mar. 19, 2020.
First Search for Chinese Application No. 201710266805.4 dated Jan. 6, 2020.
First Office Action for Chinese Application No. 201710266805.4 dated Jan. 14, 2020.
Office Action for Japanese Application No. 2019-556834 dated Nov. 10, 2020.

* cited by examiner

METHOD AND APPARATUS FOR USE IN PREVIEWING DURING IRIS RECOGNITION PROCESS

CROSS-REFERENCE TO RELATED APPLICATIONS

The present application is a continuation application of International Application No. PCT/CN2018/083590, filed on Apr. 18, 2018, which claims the priority of the Chinese Patent Application No. 201710266805.4 filed with the State Intellectual Property Office (SIPO) of the People's Republic of China on Apr. 21, 2017. The entire contents of the above-identified applications are incorporated herein by reference.

TECHNICAL FIELD

The present specification relates to the field of computer software technology, and in particular, to a preview method and apparatus for iris recognition.

BACKGROUND

The current iris recognition technology has been applied in many industries, including finance, securities, and other fields. It starts to be used on mobile phones. Ordinary consumers are also beginning to familiarize with the iris recognition technology. As the application is becoming more widespread and popular, more and more iris technology-related applications will emerge.

In the iris recognition process, an iris image of a current user is usually obtained by an Infrared Radiation (IR) camera, and the obtained iris image can be directly displayed in real time to the current user as a preview image, so that the user can verify the obtained iris image, or adjust his/her posture to recapture an iris image.

In the current technologies, an IR camera has a small field of view (FOV), and the obtained preview image usually only includes an eye image of the user, and is a monochromatic image in black and white. The above-described preview image has a poor visual effect for the user, which may affect the user's convenience of use, and adversely affect the efficiency of iris recognition.

SUMMARY

A preview method and apparatus for iris recognition are provided in the embodiments of the present specification, for at least mitigating the following technical problems in the current technologies: the preview image displayed in the iris recognition in the current technologies has a poor visual effect for the user, which may affect the user's convenience of use, and adversely affect the efficiency of iris recognition.

In order to solve the above-described technical problems, the embodiments of the present specification are implemented as follows.

In one aspect, an image preview method is provided in the embodiments of the present specification. The method may include: obtaining an iris image and a facial image of a user; determining a preview image corresponding to the iris image based on the facial image; and displaying the determined preview image.

In another aspect, a preview apparatus for iris recognition is provided in the embodiments of the present specification. The apparatus may include: an image acquisition module, a preview image determination module and a display module. The image acquisition module is configured to obtain an iris image and a facial image of a user. The preview image determination module is configured to determine the facial image as a preview image corresponding to the iris image, or determine an image obtained after performing image processing on the facial image as a preview image corresponding to the iris image. The display module is configured to display the determined preview image.

In yet another aspect, an apparatus for preview for iris recognition is provided in the embodiments of the present specification. The apparatus may include one or more cameras, one or more processors and a non-transitory computer-readable memory coupled to the one or more processors. The one or more cameras are configured to obtain an iris image and a facial image. The non-transitory computer-readable memory is configured with instructions executable by the one or more processors to cause the processor to determine a preview image corresponding to the iris image based on the facial image and display the determined preview image.

In still another aspect, a non-transitory computer-readable storage medium for preview in iris recognition is provided in the embodiments of the present specification. The non-transitory computer-readable storage medium may store instructions executable by one or more processors to cause the one or more processors to perform operations including: obtaining an iris image and a facial image of a user; determining a preview image corresponding to the iris image based on the facial image; and displaying the determined preview image.

At least one of the above-described technical solutions adopted in the embodiments of the present specification can achieve the following beneficial effects: the obtained iris image does not need to be directly used as the preview image, and the preview image determined based on the obtained facial image may be a non-monochromatic image and may include more facial content of the current user, which includes an iris. Therefore, the preview method in the present specification can provide a better visual effect, be more convenient for the user, prevent adverse effects on the efficiency of iris recognition, and can partially or completely solve the problems in the current technologies.

BRIEF DESCRIPTION OF THE DRAWINGS

In order to describe the technical solutions in the embodiments of the present specification or in the current technologies more clearly, accompanying drawings will be briefly introduced in the following. It is apparent that the accompanying drawings described in the following are merely some embodiments described in the present specification. One of ordinary skill in the art may further obtain other accompanying drawings according to these accompanying drawings without inventive efforts.

DETAILED DESCRIPTION

A preview method and apparatus for iris recognition are provided in the embodiments of the present specification.

To enable those skilled in the art to better understand the technical solutions in the present specification, the technical solutions in the embodiments of the present specification will be clearly described in the following with reference to the accompanying drawings. It is apparent that the embodiments described are merely some of rather than all the embodiments of the present specification. All the other embodiments obtained by one of ordinary skill in the art based on the embodiments in the present specification without creative efforts should fall within the protection scope of the present specification.

Figure 1:
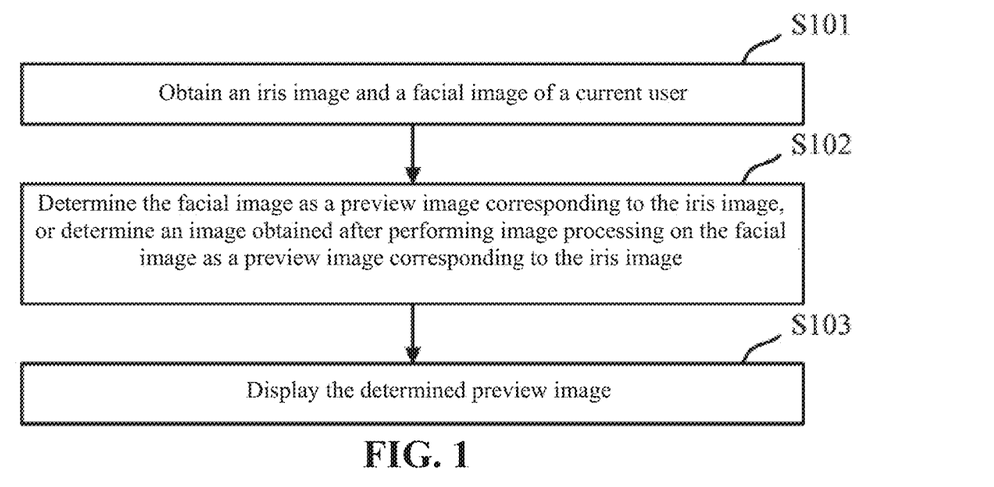
FIG. 1 is a schematic flowchart of a preview method for iris recognition according to some embodiments of the present specification.

FIG. 1 is a schematic flowchart of a preview method for iris recognition according to some embodiments of the present specification. The method may be executed by a program on a merchant terminal or a user terminal, such as a payment application and other programs that can be called on a Point Of Sale (POS) machine or a mobile device. The method may be executed by, but not limited to, at least one of the following devices that may serve as the above-described terminals: a POS machine, a mobile phone, a tablet computer, a smart wearable device, a car computer, a personal computer, and the like.

The method in FIG. 1 may comprise the following steps.

In S101, an iris image and a facial image of a current user are obtained.

In some embodiments, the iris image and the facial image may be obtained by different cameras, respectively. For example, the iris image is obtained by an IR camera, and the facial image is obtained by a non-monochromatic image camera (such as a color image camera on a mobile phone). In some embodiments, a monochromatic iris image acquisition function and a non-monochromatic image acquisition function are integrated in the same camera, and the iris image and the facial image may also be obtained by the same camera.

In other embodiments, the iris image and facial image of the current user may be obtained simultaneously, thus facilitating the improvement of the posture consistency of the current user in the iris image and the facial image. "Simultaneously" does not require that the iris image and the facial image are obtained exactly at the same moment. In general, obtaining the iris image and the facial image in parallel or almost in parallel (the time difference is generally not greater than the order of seconds) is sufficient to be considered as "simultaneously".

For example, an image acquisition instruction may be respectively sent to the IR camera and the non-monochromatic image camera simultaneously. Assuming that the cameras immediately start to obtain the corresponding images after receiving the image acquisition instruction, it may be considered that the iris image and facial image of the current user are obtained simultaneously if a difference of the instruction transmission delay is not taken into account.

In one embodiment, the iris image and facial image of the current user may also be obtained sequentially (the time difference is generally not greater than the order of seconds).

For example, an image acquisition instruction may be sent to a camera. After receiving the image acquisition instruction, the camera may first obtain the iris image of the current user, and immediately obtain the facial image of the current user soon after completing the acquisition of the iris image (the order of obtaining the two images may also be reversed).

In another embodiment, the facial image may include the entire facial content of the current user, while the iris image includes a partial facial content of the current user. When the camera for obtaining the facial image has a small field of view, the obtained facial image may include partial facial content of the current user.

In S102, the facial image is determined as a preview image corresponding to the iris image, or an image obtained after performing image processing on the facial image is determined as the preview image corresponding to the iris image.

In some embodiments, the preview image may be based on the obtained facial image. The preview image can reflect facial conditions of the current user when the iris image is obtained, such as whether the eyes focus on the lens, and whether the face is too close or too far away from the lens. These conditions can directly or indirectly reflect the effectiveness and usability of the obtained iris image.

In some other embodiments, the image processing may include at least one of the following two types: image parameter adjustment processing such as cropping, rotating, translating, zooming, scaling, color adjustment, grayscale value adjustment, and contrast adjustment; and image content retouching processing such as portrait enhancement (such as skin buffing, skin whitening, and eyeliner painting), image stylization (such as oil painting style, cartoon style, crayon drawing style, and stick figure style), and visual effects (such as light and shadow effect, particle effect, and flame effect).

The objective of the image processing is to improve the visual effect of the preview image compared to the obtained iris image, and/or to improve the ease of use of the preview image for the current user compared to the obtained iris image.

In S103, the determined preview image is displayed.

In one embodiment, after the preview image is determined, the preview image may be displayed as is or with adaptive adjustment according to a preview interface when necessary.

In another embodiment, the method in FIG. 1 may be repeated continuously until the iris image for iris recognition is finally determined. In this case, various preview images determined corresponding to the repeatedly and continuously obtained facial images may be displayed in the form of a video sequence.

With the method of FIG. 1, in some embodiments, the obtained iris image does not need to be directly used as the preview image, and the preview image determined based on the obtained facial image may be a color image and may include more facial content of the current user, including an iris. Therefore, the present embodiments can provide a better visual effect, and convenience, and improve the efficiency of iris recognition.

Based on the method of FIG. 1, some exemplary implementations and extended solutions of the method are further provided in the embodiments of the present specification, which are described in the following.

In some embodiments, the above-discussed camera, which can integrate both the monochromatic iris image acquisition function and the non-monochromatic image acquisition function, may not have been implemented, or is high in cost even if it is implemented. A scenario of using two cameras to separately obtain the iris image and the facial image as an example is illustrated below.

In some embodiments, for step S101, the obtaining an iris image and facial image of a current user may include: obtaining the iris image of the current user by a first camera, and obtaining the facial image of the current user by a second camera. The first camera may be a camera suitable for obtaining the iris image, such as an IR camera. The second camera may be a non-monochromatic camera, such as a color image camera. The acquisition method has been described in the foregoing with examples, and will not be described again.

In some other embodiments, the first camera and the second camera may be on the same device. For example, the first camera and the second camera are on the same mobile phone or POS machine, etc.

Further, the first camera and the second camera may be on the same device based on a relative positional relationship, and the relative positional relationship may facilitate the first camera and the second camera performing image acquisition actions on the current user from the same or similar directions. Taking the device as a mobile phone as an example, the first camera and the second camera may both be positioned on the front of the mobile phone or on the back of the mobile phone, and the positions of the first camera and the second camera may be relatively close (such as longitudinally closely positioned or laterally closely positioned, etc.).

Figure 2:
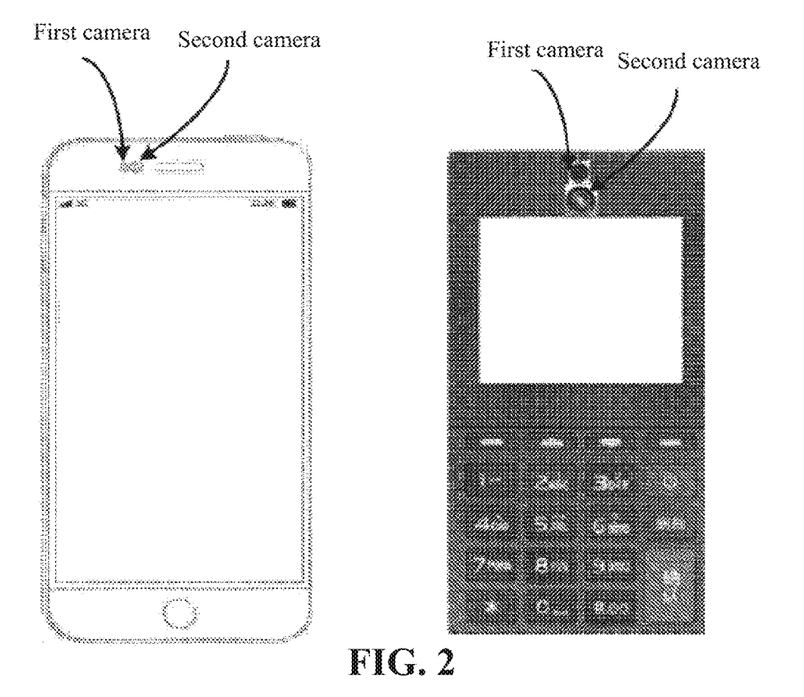
FIG. 2 is a schematic diagram showing positions of a first camera and a second camera on a device according to some embodiments of the present specification.

For ease of understanding, a schematic diagram of positions of a first camera and a second camera on a device is provided in the embodiments of the present specification, as shown in FIG. 2.

FIG. 2 includes two schematic diagrams of positions. In the left schematic diagram of positions, the device is a mobile phone. The first camera and the second camera are both positioned on the front of the mobile phone, and are adjacent to each other in a horizontal direction. The lenses of the first camera and the second camera have the same direction and are positioned closely to each other. In the right schematic diagram of positions, the device is a POS machine. The first camera and the second camera are both positioned on the front of the POS machine, and are adjacent to each other in a vertical direction. The lenses of the first camera and the second camera have the same direction and are positioned closely to each other. The positions of the cameras in FIG. 2 enable the first camera and the second camera to conveniently perform image acquisition actions on the user from the same or similar directions, thus improving of the posture consistency of the current user in the iris image and the facial image.

In some other embodiments, for step S102, the performing image processing on the facial image may include: performing the image processing on the facial image according to at least one of the following information: the iris image, information of the first camera, information of the second camera, and information of a relative positional relationship between the first camera and the second camera.

As mentioned above, the objective of the image processing is to improve the ease of use of the preview image, or to improve the visual effect of the preview image. For example, a common requirement is as follows: the actual content (i.e., an image of at least part of the facial content of the current user) respectively included in the preview image and that included in the iris image are substantially consistent (but having different visual effects). In some embodiments, even though the actual contents included respectively are not consistent, inconsistent parts can be as useful as possible. The image of the facial content excluding the iris part of the current user may be considered as useful information (because it is more advantageous to enhance the visual effect or usability for the user), while the image of the content other than the current user's facial content may be considered as useless information. This makes it easier for the current user to preview better.

The requirement in the previous paragraph may be implemented based on the image processing described above. For example, the image processing can be illustrated by processing an image size. In some embodiments, if the iris image and facial image of the current user are obtained simultaneously, and if the lenses of the first camera and the second camera have the same direction and are positionally close to each other. In such cases, a field-of-view difference between the cameras can be a main factor causing the inconsistency between the actual contents included in the iris image and the facial image, and a description will be made with reference to FIG. 3a and FIG. 3b.

Figure 3A:
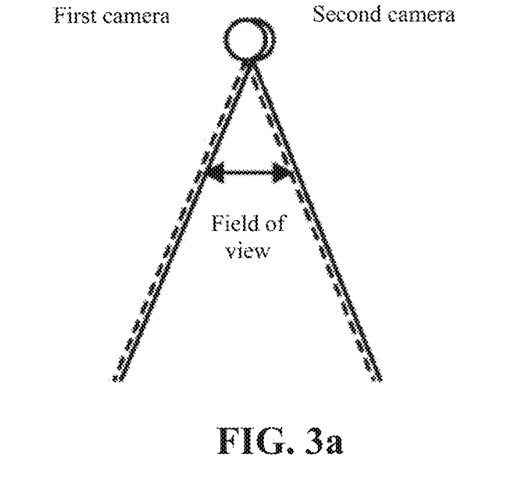
FIG. 3*a* is a schematic diagram showing a first camera and a second camera with substantially consistent fields of view according to some embodiments of the present specification.

FIG. 3a is a schematic diagram of a first camera and a second camera with substantially consistent fields of view according to some embodiments of the present specification. The dotted line represents the field of view of the first camera, and the solid line represents the field of view of the second camera. In the scenario of FIG. 3a, the actual contents respectively included in the facial image and the iris image may also be substantially consistent correspondingly. Therefore, the facial image may be directly determined as a preview image corresponding to the iris image without additionally adjusting the image size. Such a method is mainly suitable for a situation where the iris image is a monochromatic image and the facial image is a non-monochromatic image. In this way, the visual effect of the preview image can be improved.

Figure 3B:
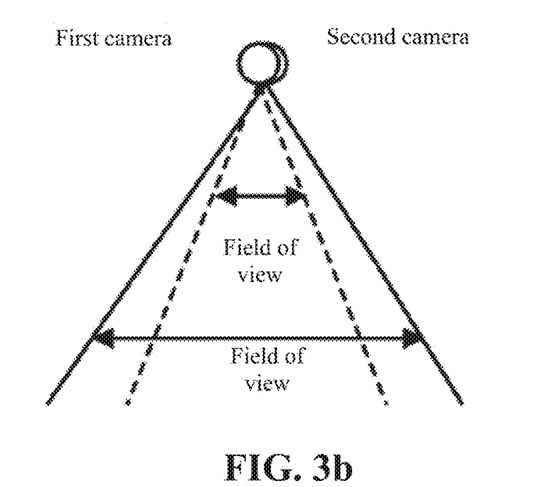
FIG. 3*b* is a schematic diagram of a first camera and a second camera with different fields of view according to some embodiments of the present specification.

FIG. 3b is a schematic diagram of a first camera and a second camera with different fields of view according to some embodiments of the present specification. In the scenario of FIG. 3b, a difference may also exist correspondingly between the actual contents included in the facial image and the iris image, and such difference may increase with the increase of the distance between the current user and the camera. In this case, an image obtained after a size adjustment of the facial image may be determined as the preview image corresponding to the iris image. After the image processing, the obtained actual contents respectively included in the preview image and the iris image are substantially consistent (the preview image has a relatively better visual effect). Alternatively, even if the actual contents included respectively are not consistent, inconsistent parts belonging to the facial content image of the current user rather than the background image are kept as much as possible. The reason is that in a scenario of iris recognition, the facial content image is more helpful to the improvement of the visual effect of the preview image than the background image, which can be retained preferentially.

In one example, both the preview image and the iris image include an eye image of the current user. In another example, the iris image includes the eye image of the current user, and the preview image includes an image of the entire facial content of the current user. Compared with the preview image, the facial image may additionally include an image of a background. With the image size adjustment processing, the preview image may be obtained by cropping off the background image as much as possible from the facial image.

An exemplary processing method is provided as follows.

In practical applications, in general, the field of view of the first camera, such as the IR camera, is relatively small, as is the case in FIG. 3b. In such cases, the information of the first camera and the information of the second camera described above may include a field of view.

The performing the image processing on the facial image according to information of the first camera and information of the second camera may include: determining distances from the first camera and the second camera to the current user (the distances may be, for example, determined synchronously at the time of image acquisition), respectively; and performing the image processing on the facial image according to the field of view of the first camera, the field of view of the second camera, and the determined distances. The distances may be determined by, for example, a ranging module such as an infrared ranging module or an acoustic ranging module on the device.

In some embodiments, the field of view of the first camera is smaller than that of the second camera; and the performing the image processing on the facial image according to the field of view of the first camera, the field of view of the second camera, and the determined distances may include: determining a field-of-view difference between the first camera and the second camera according to the field of view of the first camera and the field of view of the second camera; and performing the image cropping processing on the facial image according to the field-of-view difference and the determined distances.

In some other embodiments, in addition of the field of view, information of the camera may be other information reflecting the function or performance of the camera, such as a focal length, a shutter time, and the like. The other information may also be used as a basis for processing the facial image.

As can be seen from the descriptions of FIG. 3a and FIG. 3b, the exemplary embodiment in the scenario of FIG. 3a is simpler and less expensive than FIG. 3b, and the scenario of FIG. 3b also has its own advantages.

For example, in an exemplary embodiment, the first camera is not necessarily only used to obtain a facial image in the process of iris recognition. The first camera, on a user terminal such as a mobile phone, may be a camera used when the user takes pictures or videos in daily life. As such, the first camera usually has a large field of view and is thus difficult to be applied in the scenario in FIG. 3a, but may be applicable to the scenario in FIG. 3b. On a merchant terminal such as a POS machine, there may be no requirement of a large field of view for the first camera. The field of view of the first camera may be substantially consistent with that of the second camera, and thus can be applicable to the scenario in FIG. 3a.

In one embodiment, for the scenario in FIG. 3b, the preview image may also be obtained by cropping the facial image by image matching according to the iris image.

In another embodiment, if the direction of the first camera is different from that of the second camera, or the position of the first camera is different from that of the second camera, i.e., the first camera and the second camera are not positionally close to each other, the preview image may be obtained by position corrections such as rotating or translating the facial image correspondingly. The position corrections can be performed according to one or more of the information that may reflect these differences such as the field of view of the first camera, the field of view of the second camera, information of the relative positional relationship, and the distances.

In yet another embodiment, for step S103, the preview image includes an eye image of the current user, and the displaying the determined preview image may include: determining a preview interface of the iris recognition; and displaying the determined preview image in the preview interface, or displaying the preview image in the preview interface after adaptively adjusting the preview image according to the preview interface. A display position of the eye image in the preview interface reflects eye alignment conditions of the current user when the iris image of the current user is obtained. The adaptive adjustment may be, for example, zooming or format conversion.

Figure 4:
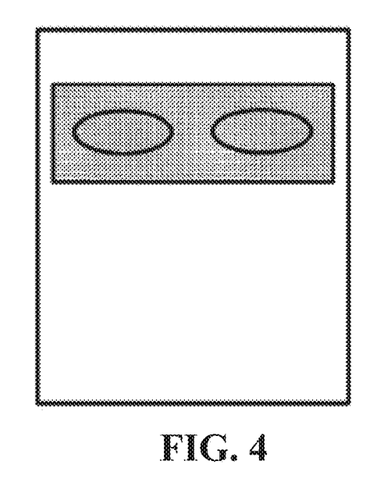
FIG. 4 is a schematic diagram of a preview interface according to some embodiments of the present specification.

For the ease of understanding, a schematic diagram of a preview interface is provided as an example, as shown in FIG. 4.

Figure 5:
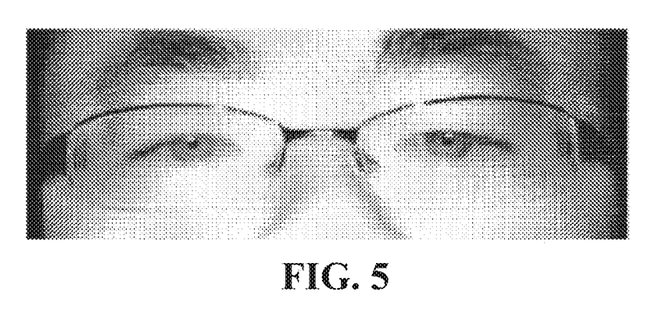
FIG. 5 is a schematic diagram of an iris image according to the current technologies.

In the preview interface of FIG. 4, a grey interval represents a range of the user's eyes where the iris may be normally obtained, two holes in the middle represent the best position of the eyes (the current user can align the eyes with reference to the holes, so as to accurately obtain the iris image), and an outer frame is a range where the entire face can be previewed. In this way, the iris image can be obtained by an IR camera when the face is previewed based on a non-monochromatic camera. FIG. 5 is a schematic diagram of an iris image according to the current technologies. When the preview image is displayed in the preview interface of FIG. 4 by using the solutions of the present specification, the part of the preview image corresponding to the iris image in FIG. 5 should be displayed in the grey range provided that the posture of the current user is correct.

Figure 6:
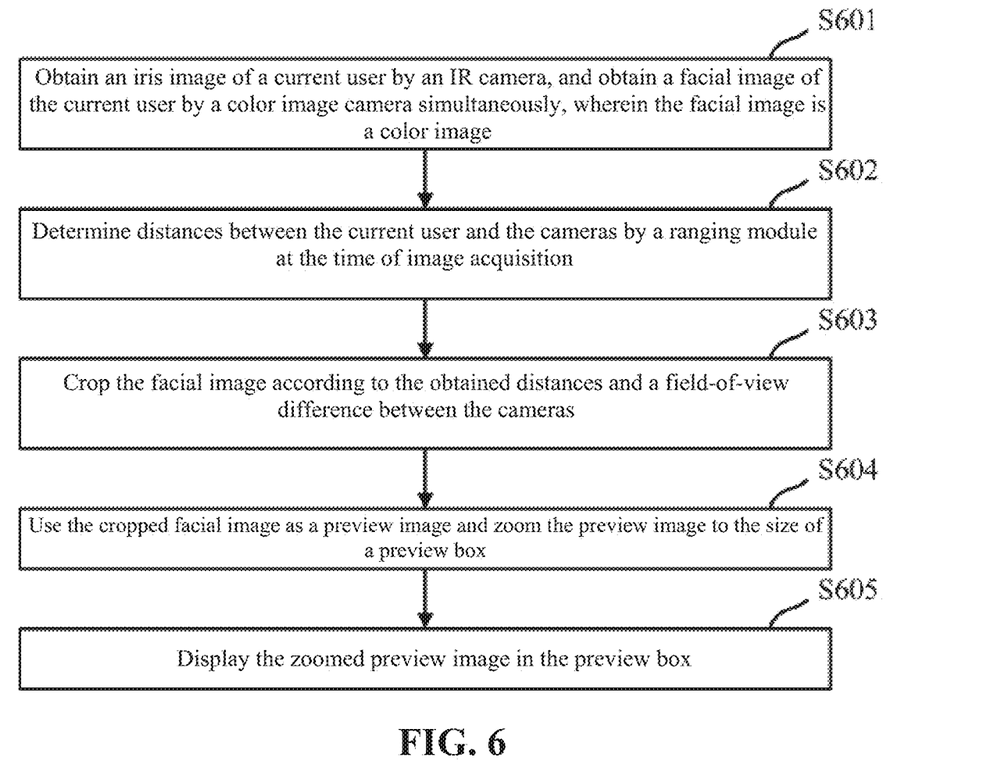
FIG. 6 is a schematic flowchart of an exemplary implementation of the above-described preview method in an exemplary application scenario according to some embodiments of the present specification.

According to the above description, a schematic flowchart of an embodiment of the above preview method in an exemplary scenario is further provided, as shown in FIG. 6.

In the scenario of FIG. 6, the above-described first camera is an IR camera, the second camera is a color image camera, the preview interface is a preview box, and the field of view of the IR camera is smaller than that of the color image camera. The process in FIG. 6 may include the following steps.

In S601, an iris image of a current user is obtained by an IR camera, and a facial image of the current user is obtained by a color image camera simultaneously, wherein the facial image is a color image.

In S602, distances between the current user and the cameras are measured respectively by a ranging module at the time of image acquisition.

In S603, the facial image is cropped according to the obtained distances and a field-of-view difference between the cameras.

In S604, the cropped facial image is used as a preview image and the preview image is zoomed to the size of a preview box.

In S605, the zoomed preview image is displayed in the preview box.

In some embodiments, the facial image is not necessarily required to be a non-monochromatic image. A non-monochromatic preview image may be obtained by image processing such as coloring the facial image, so that the visual effect can also be improved. Moreover, converting a monochromatic image to a non-monochromatic image is one but not the only one method to improve the visual effect. Even if the facial image and the preview image are both monochromatic images, the visual effect may still be improved.

For example, the preview image may be obtained after portrait enhancement is performed on the facial image, the preview image may be obtained after cartoon style processing is performed on the facial image, and so on.

A preview method for iris recognition according to some embodiments of the present specification is provided above. Based on the same inventive idea, a corresponding apparatus is further provided in the embodiments of the present specification, as shown in FIG. 7.

Figure 7:
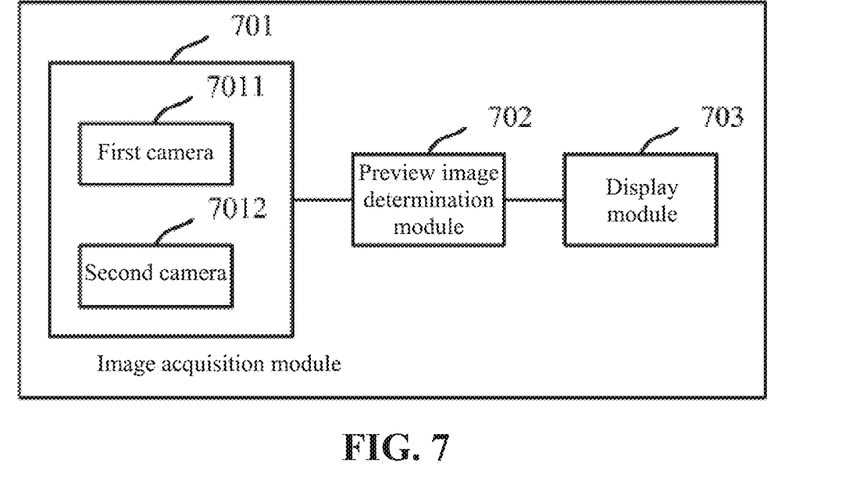
FIG. 7 is a schematic structural diagram of a preview apparatus for iris recognition corresponding to FIG. 1 according to some embodiments of the present specification.

FIG. 7 is a schematic structural diagram of a preview apparatus for iris recognition corresponding to FIG. 1 according to some embodiments of the present specification. The apparatus may be located on an executive entity performing the process in FIG. 1, comprising: an image acquisition module 701 configured to obtain an iris image and a facial image of a current user; a preview image determination module 702 configured to determine the facial image as a preview image corresponding to the iris image, or determine an image obtained after performing image processing on the facial image as a preview image corresponding to the iris image; and a display module 703 configured to display the determined preview image.

In one embodiment, the image acquisition module 701 comprises a first camera 7011 and a second camera 7012.

The first camera 7011 is configured to obtain the iris image of the current user, and the second camera 7012 is configured to obtain the facial image of the current user.

In another embodiment, the first camera 7011 and the second camera 7012 are positioned on the same device based on a relative positional relationship, and the relative positional relationship may facilitate the first camera 7011 and the second camera 7012 obtaining images on the current user from the same or similar direction.

In yet another embodiment, the preview image determination module 702 is configured to perform image processing on the facial image according to at least one of the following: the iris image, information of the first camera 7011, information of the second camera 7012, and information of the relative positional relationship between the first camera 7011 and the second camera 7012.

In yet another embodiment, the information of the first camera 7011 and the information of the second camera 7012 comprises a field of view; and the preview image determination module 702 is configured to perform the image processing on the facial image according to the information of the first camera 7011 and the information of the second camera 7012.

The preview image determination module 702 is configured to determine distances from the first camera 7011 and the second camera 7012 to the current user; and perform the image processing on the facial image according to the field of view of the first camera 7011, the field of view of the second camera 7012, and the determined distances.

In some embodiments, the field of view of the first camera 7011 is smaller than that of the second camera 7012; and the preview image determination module 702 is configured to determine a field-of-view difference between the first camera 7011 and the second camera 7012 according to the field of view of the first camera 7011 and the field of view of the second camera 7012; and perform the image cropping processing on the facial image according to the field-of-view difference and the determined distances.

In some other embodiments, the preview image includes an eye image of the current user, and the display module 703 is configured to determine a preview interface of the iris recognition; and display the determined preview image in the preview interface, or display the preview image in the preview interface after adaptively adjusting the preview image according to the preview interface.

In some embodiments, a display position of the eye image in the preview interface reflects eye alignment conditions of the current user when the iris image of the current user is obtained.

In one embodiment, the image processing comprises at least one of two types of processing: an image parameter adjustment processing and an image content retouching processing; the image parameter processing comprises at least one of cropping, rotation, translation, zooming, scaling, color adjustment, grayscale value adjustment, and contrast adjustment; and the image content retouching processing comprises at least one of portrait enhancement, image stylization, and special visual effect.

In another embodiment, the iris image is a monochromatic image, and the facial image is a non-monochromatic image.

In yet another embodiment, the first camera 7011 is a monochromatic image camera, and the second camera 7012 is a non-monochromatic image camera.

The apparatus provided in the embodiments of the present specification corresponds to the preview methods. Therefore, the apparatus also has beneficial technical effects similar to those of the corresponding methods. As the beneficial technical effects of the methods have been described above in detail, the beneficial technical effects of the corresponding apparatus are not elaborated here.

The present specification also provides an apparatus for preview in an iris recognition process. The apparatus may include one or more cameras, one or more processors and a non-transitory computer-readable memory coupled to the one or more processors. The one or more cameras are configured to obtain an iris image and a facial image. The non-transitory computer-readable memory is configured with instructions executable by the one or more processors to cause the processor to determine a preview image corresponding to the iris image based on the facial image and display the determined preview image.

The present specification further provides a non-transitory computer-readable storage medium for preview in an iris recognition process. The non-transitory computer-readable storage medium may store instructions executable by one or more processors causing the one or more processors to perform operations. The operations may include: obtaining an iris image and a facial image of a user; determining a preview image corresponding to the iris image based on the facial image; and displaying the determined preview image.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of various technologies, improvements of many method procedures at present may be considered as direct improvements on hardware circuit structures. Almost all designers program the improved method procedures into hardware circuits to obtain corresponding hardware circuit structures. Therefore, it cannot be said that the improvement of a method procedure cannot be implemented using a hardware entity module. For example, a Programmable Logic Device (PLD) (for example, a Field Programmable Gate Array (FPGA)) is such an integrated circuit, and logic functions thereof are determined by a user programming devices. Designers program by themselves to "integrate" a digital system into a piece of PLD, without inviting a chip manufacturer to design and manufacture a dedicated integrated circuit chip. Moreover, at present, the programming is mostly implemented by using "logic compiler" software, instead of manually manufacturing an integrated circuit chip. The "logic compiler" software is similar to a software complier used for developing and writing a program, and original code before compiling also needs to be written in a specific programming language, which is referred to as a Hardware Description Language (HDL). There are many types of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language), among which VHDL (Very-High-Speed Integrated Circuit Hardware Description Language) and Verilog are most commonly used now. Those skilled in the art also should know that a hardware circuit for implementing the logic method procedure may be easily obtained only by slightly logically programming the method procedure using the above-described several hardware description languages and programming same into an integrated circuit.

A controller may be implemented in any suitable manner. For example, the controller may be in the form of a microprocessor or a processor, and a computer readable medium storing computer readable program codes (for example, software or firmware) executable by the (micro) processor, a logic gate, a switch, an Application Specific Integrated Circuit (ASIC), a programmable logic controller, and an embedded micro-controller. Examples of the controller include, but are not limited to, the following microcontrollers: ARC 625D, Atmel AT91SAM, Microchip PIC18F26K20, and Silicone Labs C8051F320. A memory controller may also be implemented as a part of a control logic of a memory. Those skilled in the art also know that, in addition to implementing the controller by pure computer readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein for implementing various functions may also be considered as structures inside the hardware component. Alternatively, the apparatuses for implementing various functions may even be considered as both software modules for implementing the method and structures inside the hardware components.

The system, apparatus, modules or units illustrated in the above-described embodiments can be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the above-described apparatus is divided into various modules based on functions, and the modules are described separately. Of course, when the present specification is implemented, functions of various units can be implemented in one or more pieces of software and/or hardware.

Those skilled in the art should understand that the embodiments of the present specification may be provided as a method, a system, or a computer program product. Therefore, the present specification may be implemented in a form of complete hardware embodiments, complete software embodiments, or embodiments combining software and hardware. Moreover, the present specification may be in the form of a computer program product implemented on one or more computer usable storage mediums (including, but not limited to, a magnetic disk memory, a CD-ROM, an optical memory and the like) including computer usable program codes therein.

The present specification is described with reference to flowcharts and/or block diagrams of the method, device (system) and computer program product according to the embodiments of the present specification. It should be understood that computer program instructions may implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of other programmable data processing devices to produce a machine, so that an apparatus for implementing a specified function in one or more processes in the flowcharts and/or in one or more blocks in the block diagrams is produced by the instructions executed by the processor of the computer or other programmable data processing devices.

These computer program instructions may also be stored in a computer readable memory that can guide a computer or other programmable data processing devices to operate in a particular manner, such that the instructions stored in the computer readable memory produces a manufactured product, including an instruction apparatus. The instruction apparatus implements a function specified in one or more processes in the flowcharts and/or in one or more blocks in the block diagrams.

These computer program instructions may also be loaded onto a computer or other programmable data processing devices, such that a series of operation steps are performed on the computer or other programmable devices, thus producing computer-implemented processing. Therefore, the instructions executed on the computer or other programmable devices provide steps for implementing a function specified in one or more processes in the flowcharts and/or in one or more blocks in the block diagrams.

In a typical configuration, the computing device comprises one or more central processing units (CPUs), an input/output interface, a network interface, and a memory.

The memory may include a computer-readable medium such as a non-persistent memory, a Random Access Memory (RAM), and/or a non-volatile memory, e.g., a Read-Only Memory (ROM) or a flash RAM. The memory is an example of a computer-readable medium.

The computer readable medium includes a persistent (non-volatile) and non-persistent (volatile) medium as well as a removable and non-removable medium, and may store information by any method or technology. The information may be a computer-readable instruction, a data structure, a module of a program, or other data. An example of the storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer-readable medium does not include a computer-readable transitory medium, such as modulated data signals and carriers.

It should be further noted that terms "include", "comprise", or any other variations thereof are intended to cover non-exclusive inclusion, so that a process, method, commodity or device including a series of elements not only includes the elements, but also includes other elements not clearly listed, or further includes elements inherent to the process, method, commodity or device. In the absence of more limitations, an element defined by "including a/an . . ." does not exclude that the process, method, commodity or device including the element further has other identical elements.

The present specification may be described in a general context of computer executable instructions executed by a computer, for example, a program module. Generally, the program module includes a routine, a program, an object, a component, a data structure, and the like for executing a specific task or implementing a specific abstract data type. The present specification may also be practiced in distributed computing environments. In the distributed computing environments, a task is executed by a remote processing device connected through a communications network. In the distributed computing environments, the program module may be located in a local and remote computer storage medium, including a storage device.

Various embodiments in the description are all described in a progressive manner. For the same or similar parts among the embodiments, reference can be made to one another. For each embodiment, the part thereof different from the other embodiments is mainly described. Particularly, the system embodiments are described in a relatively simple manner because they are substantially similar to the method embodiments, and for related parts, reference can be made to the parts of the description in the method embodiments.

Described above are merely embodiments of the present specification, and is not used to limit the present specification. For those skilled in the art, the present specification may have various changes and variations. Any modification, equivalent replacement, improvement and the like made within the spirit and principle of the present specification should be included in the scope of the claims of the present specification.

The invention claimed is:

1. An image preview method, comprising:
  obtaining an iris image of a user by a first camera and a facial image of the user by a second camera, wherein the first camera and the second camera are on a same device and have a relative positional relationship configured to obtain images of the user from a same direction;
  performing image processing on the facial image, by:
    determining a first distance from the first camera to the user and a second distance from the second camera to the user;
    performing the image processing on the facial image according to a first field of view of the first camera, a second field of view of the second camera, the first distance, the second distance, and information of the relative positional relationship between the first camera and the second camera; and
    performing image content retouching processing on the facial image, wherein the image content retouching processing comprises at least one of portrait enhancement, image stylization, and special visual effect;
  determining the processed facial image as a preview image corresponding to the iris image; and
  displaying the determined preview image.

2. The method of claim 1, wherein
the image processing comprises at least one of image parameter adjustment processing; and
the image parameter adjustment processing comprises at least one of cropping, rotation, translation, zooming, scaling, color adjustment, grayscale value adjustment, and contrast adjustment.

3. The method of claim 1, wherein the first field of view is different from the second field of view; and
the performing the image processing on the facial image further comprises:
  determining a field-of-view difference between the first camera and the second camera according to the first field of view and the second field of view; and
  performing image cropping on the facial image according to the field-of-view difference, the first distance and the second distance to obtain the preview image.

4. The method of claim 3, wherein the facial image includes a background image, an iris part image of the user, and facial content excluding the iris part image of the user, and the performing image cropping on the facial image comprises: removing the background image and keeping the iris part image and the facial content excluding the iris part image of the user.

5. The method of claim 1, wherein the preview image includes an eye image of the user, and the displaying the determined preview image comprises:
  determining a preview interface; and
  displaying the determined preview image in the preview interface, wherein a display position of the eye image in the preview interface corresponds an eye alignment condition of the user when obtaining the iris image.

6. The method of claim 1, wherein the iris image and the facial image are obtained simultaneously.

7. The method of claim 1, further comprising:
  obtaining a plurality of facial images of the user;
  determining a plurality of preview images corresponding to the plurality of the facial images; and
  displaying the plurality of the preview images in a form of a video sequence.

8. An apparatus for image preview, comprising a first camera and a second camera with a relative positional relationship configured to obtain images of a user from a same direction, one or more processors and a non-transitory computer-readable memory coupled to the one or more processors, wherein:
  the first camera is configure to obtain an iris image of the user;
  the second camera is configured to obtain a facial image of the user; and
  the non-transitory computer-readable memory is configured with instructions executable by the one or more processors to:
    perform image processing on the facial image, by:
      determining a first distance from the first camera to the user and a second distance from the second camera to the user;
      performing the image processing on the facial image according to a first field of view of the first camera, a second field of view of the second camera, the first distance, the second distance, and information of the relative positional relationship between the first camera and the second camera; and performing image content retouching processing on the facial image, wherein the image content retouching processing comprises at least one of portrait enhancement, image stylization, and special visual effect;

determine the processed facial image as a preview image corresponding to the iris image; and display the determined preview image.

9. The apparatus of claim 8, wherein the image processing comprises at least one of image parameter adjustment processing; and the image parameter adjustment processing comprises at least one of cropping, rotation, translation, zooming, scaling, color adjustment, grayscale value adjustment, and contrast adjustment.

10. The apparatus of claim 9, wherein the iris image and the facial image are obtained simultaneously.

11. The apparatus of claim 8, wherein the first field of view is different from the second field of view; and the performing the image processing on the facial image further comprises:

determining a field-of-view difference between the first camera and the second camera according to the first field of view and the second field of view; and performing image cropping on the facial image according to the field-of-view difference, the first distance, and the second distance.

12. The apparatus of claim 11, wherein the facial image includes a background image, an iris part image of the user, and facial content excluding the iris part image of the user, and the performing image cropping on the facial image comprises: removing the background image and keeping the iris part image and the facial content excluding the iris part image of the user.

13. The apparatus of claim 8, wherein the preview image includes an eye image of the user, and the displaying the determined preview image comprises:

determining a preview interface; and displaying the determined preview image in the preview interface, wherein a display position of the eye image in the preview interface corresponds an eye alignment condition of the user when obtaining the iris image.

14. The apparatus of claim 8, wherein the instructions are executable by the one or more processors to:

obtain a plurality of facial images of the user;

determine a plurality of preview images corresponding to the plurality of the facial images; and display the plurality of the preview images in a form of a video sequence.

15. A non-transitory computer-readable storage medium storing instructions executable by one or more processors to cause the one or more processors to perform operations comprising:

obtaining an iris image of a user by a first camera and a facial image of the user by a second camera, wherein the first camera and the second camera are on a same device and have a relative positional relationship configured to obtain images of the user from a same direction;

performing image processing on the facial image, by:

determining a first distance from the first camera to the user and a second distance from the second camera to the user;

performing the image processing on the facial image according to a first field of view of the first camera, a second field of view of the second camera, the first distance, the second distance, and information of the relative positional relationship between the first camera and the second camera; and performing image content retouching processing on the facial image, wherein the image content retouching processing comprises at least one of portrait enhancement, image stylization, and special visual effect;

determining the processed facial image as a preview image corresponding to the iris image; and displaying the determined preview image.

16. The non-transitory computer-readable storage medium of claim 15, wherein the preview image includes an eye image of the user, and the displaying the determined preview image comprises:

determining a preview interface; and displaying the determined preview image in the preview interface, wherein a display position of the eye image in the preview interface corresponds an eye alignment condition of the user when obtaining the iris image.

17. The non-transitory computer-readable storage medium of claim 15, wherein the facial image includes a background image, an iris part image of the user, and facial content excluding the iris part image of the user, and the performing image processing on the facial image comprises: removing the background image and keep the iris part image and the facial content excluding the iris part image of the user.

18. The non-transitory computer-readable storage medium of claim 15, wherein the operations further comprise:

obtaining a plurality of facial images of the user;

determining a plurality of preview images corresponding to the plurality of the facial images; and displaying the plurality of the preview images in a form of a video sequence.

* * * * *